(12) United States Patent  (10) Patent No.: US 7,820,236 B2
Pokorny et al.  (45) Date of Patent: Oct. 26, 2010

(54) OPTICAL FILM COATING

(75) Inventors: Richard J. Pokorny, Maplewood, MN (US); Robert A. Yapel, Oakdale, MN (US); Jason W. Balich, Beverly, MA (US)

(73) Assignee: 3M Innovative Properties Company, St. Paul, MN (US)

( * ) Notice: Subject to any disclaimer, the term of this patent is extended or adjusted under 35 U.S.C. 154(b) by 169 days.

(21) Appl. No.: 12/048,577

(22) Filed: Mar. 14, 2008

(65) Prior Publication Data

US 2008/0160186 A1  Jul. 3, 2008

Related U.S. Application Data

(62) Division of application No. 10/888,170, filed on Jul. 9, 2004, now Pat. No. 7,378,136.

(51) Int. Cl.
*B05D 5/06*  (2006.01)

(52) U.S. Cl. ..................................... 427/162

(58) Field of Classification Search .......... 427/162–169
See application file for complete search history.

(56) References Cited

U.S. PATENT DOCUMENTS

| 4,573,766 A | 3/1986 | Bournay et al. |
| 4,719,141 A | 1/1988 | Collier |
| 4,885,332 A | 12/1989 | Balkadi |
| 5,055,337 A | 10/1991 | Shinonome et al. |
| 5,104,929 A | 4/1992 | Bilkadi et al. |
| 5,132,356 A | 7/1992 | Siddiqui |
| 5,354,595 A | 10/1994 | Yamamoto et al. |
| 5,581,905 A | 12/1996 | Huelsman et al. |
| 5,677,050 A | 10/1997 | Bilkadi et al. |
| 5,694,701 A | 12/1997 | Huelsman et al. |
| 5,773,126 A | 6/1998 | Noritake et al. |
| 6,129,971 A | 10/2000 | Brandt et al. |
| 6,134,808 A | 10/2000 | Yapel et al. |
| 6,147,821 A | 11/2000 | Kadokura et al. |

(Continued)

FOREIGN PATENT DOCUMENTS

DE  2109752  4/1972

(Continued)

OTHER PUBLICATIONS

Burke, "Solubility Parameters: Theory and Application, Part 2—The Hildebrand Solubility Parameter", The Oakland Museum of California, Oakland, California, USA, [retrieved from the Internet on Aug. 24, 2005], Aug. 1984, XP-002362857, 4pp.

*Primary Examiner*—Timothy H Meeks
*Assistant Examiner*—Elizabeth Burkhart
(74) *Attorney, Agent, or Firm*—Jay R. Pralle (57) ABSTRACT

A low fringing film coating includes a transparent polymeric layer having a surface, and a plurality of projections extending away from the surface. The projections have a mean height of 0.05 to 1 μm and a mean distance between projections of 0.5 to 2 mm. The coating can be produced by coating a polymeric composition onto a substrate. The polymeric composition includes a polymeric material, a good solvent for the polymeric material and a poor solvent or the polymeric material. The solvents are at least partially evaporated to form a low fringing transparent polymeric layer.

17 Claims, 7 Drawing Sheets

U.S. PATENT DOCUMENTS

| | | |
|---|---|---|
| 6,187,248 B1 | 2/2001 | O'Neill et al. |
| 6,255,392 B1 | 7/2001 | Inoue et al. |
| 6,503,564 B1 | 1/2003 | Fleming et al. |
| 6,822,792 B2 | 11/2004 | Goto |
| 6,964,815 B2 | 11/2005 | Yoshitake et al. |
| 7,033,638 B2 * | 4/2006 | Suzuki ................ 427/162 |
| 2001/0011779 A1 | 8/2001 | Stover |
| 2001/0012159 A1 | 8/2001 | Umemoto et al. |
| 2002/0154100 A1 | 10/2002 | Hatakeda et al. |
| 2002/0192437 A1 | 12/2002 | Takagi et al. |
| 2003/0027922 A1 | 2/2003 | Wampecht et al. |
| 2003/0112520 A1 | 6/2003 | Takahashi et al. |
| 2004/0081764 A1 * | 4/2004 | Liu et al. ................. 427/376.1 |
| 2004/0242823 A1 * | 12/2004 | Sekiguchi et al. ........... 526/279 |

FOREIGN PATENT DOCUMENTS

| | | |
|---|---|---|
| GB | 1 341 090 | 12/1973 |
| GB | 2 031 301 | 4/1980 |
| JP | 09 272183 | 10/1997 |
| JP | 2001075299 | 3/2001 |
| WO | WO 01/29148 * | 4/2001 |
| WO | WO 02/088784 | 11/2002 |

* cited by examiner

OPTICAL FILM COATING

CROSS REFERENCE TO RELATED APPLICATIONS

This application is a divisional of Ser. No. 10/888,170, filed Jul. 9, 2004, now U.S. Pat. No. 7,378,136, the disclosure of which is incorporated by reference in its entirety herein.

BACKGROUND

This disclosure relates to optical film coatings. Specifically, this disclosure relates to optical film coatings that reduce interference colors known as Newton rings.

Optical displays typically have an exposed viewing surface made from a thermoplastic film or substrate. Commonly employed thermoplastic polymers have very good optical transparency, dimensional stability and impact resistance, but unfortunately have poor abrasion resistance. The optical displays of devices such as personal digital assistants (PDAs), cell phones, liquid crystal display (LCD) panels, touch-sensitive screens and removable computer filters are subjected to frequent handling and contact with the user's face or fingers, styli, jewelry and other objects. For example, facial oils can adversely affect contrast, color saturation or brightness of a cell phone display. The screens of projection televisions and laptop computers are handled less frequently but nonetheless are susceptible to being touched, scratched or smudged. Consequently, the viewing face of the display is susceptible to scratches, abrasion and smudges arising during routine use. This can cause the display to lose resolution and clarity, and sometimes to become unreadable or inoperative. To protect such displays, protective films or coatings can be employed.

Hard coats have been used to protect the face of optical displays. These hard coats typically contain inorganic oxide particles, e.g., silica, of nanometer dimensions dispersed in a binder precursor resin matrix, and sometimes are referred to as "ceramers". These hard coats can have a thickness in a range of 1 to 15 µm. Current hard coat films produce optical interference fringes attributable at least in part to non-uniform thickness of the hard coat layer.

When light enters a hard coated display, the reflectivity of the light undergoes a period change according to the wavelength of the incident light. The reflection spectrum with the aforementioned specific repeating period is referred to as an interference fringe. Attempts have been made to reduce or eliminate these interference fringes. The amplitude of the fringe may depend on the difference in the index of refraction between the substrate and the hard coat layer. The greater the difference in the index of refraction between the substrate and the hard coat layer, the greater the amplitude and contrast of the interference pattern.

In the past, in order to eliminate the aforementioned interference pattern, several methods described below have been used. The first method is to increase the hard coat film thickness significantly. When a thick hard coat layer is used, the frequency of the fringes becomes smaller and the color change becomes insignificant even when the thickness of the hardcoat layer varies from area to area. However, a thick hard coat presents new problems. First, in order to cover the interference pattern, it is necessary to coat a hard coat layer a thickness of at least 20 µm to 30 µm. As a consequence, shrinkage of the hard coat layer at the time of curing is increased significantly and coating is difficult and the cost is increased significantly. Furthermore, cracks are likely to form in the hard coat layer as well.

A second method is to match the index of refraction of the substrate with the index of refraction of the hard coat layer. For example, in general, the index of refraction of the hard coat layer is in the range of approximately 1.49 to 1.55; thus, when a TAC film with an index of refraction of 1.49 is used for the substrate, the amplitude of the fringes becomes very low since the index of refraction of the substrate and that of the hard coat layer are essentially the same and contrast of the interference pattern is reduced. However, in comparison to polyethylene terephthalate (PET) film, the cost of TAC film is considerably higher, and furthermore the film itself is soft and rupturing occurs easily. Because of the soft material used for the substrate itself, craters are likely to form at the time of coating and surface flaws are likely to occur. In addition, the TAC film underneath the hard coat layer is soft, thus, the pencil hardness is reduced even with the hard coat layer.

A third method is to match the index of refraction of the hard coat layer with the index of refraction of the substrate, since the substrate may be limited by the particular application. For example, an appropriate amount of one or more metal oxide super-fine particles with high index of refraction selected from the group consisting of ZnO, $TiO_2$, $CeO_2$, $Sb_2O_5$, ITO, $In_2O_3$, $Y_2O_3$, $La_2O_3$, $Al_2O_3$, $HfO_2$ and $ZrO_2$ are mixed with a binder made of a thermosetting resin and/or an ionizing radiation curable type resin to form a hard coat layer, and the index of refraction of the aforementioned hard coat layer is brought closer to the index of refraction of the PET film (in general, approximately 1.65). However, this technique may cause many problems. First, in general, the metal oxide super-fine particles are materials with color and when the hard coat layer is coated with a film thickness of at least 3 µm to satisfy the performance of the hard coat, in many cases, the coating is colored. When toning is done to eliminate the color (to achieve specific transmittance at each wavelength) overall transmittance is reduced. Furthermore, when super-fine particles other than silica are included, hardness is reduced in comparison to the case where a hard coat layer alone is used. When the index of refraction of the hard coat layer of the outermost layer is increased, reflectivity is increased. As a result, the transmittance required for transparent optical material cannot be achieved.

As described above, the greater the difference in the index of refraction between the substrate and hard coat layer, the greater the amplitude and contrast of the interference pattern. When the contrast of the aforementioned interference pattern is high, the viewer can experience significant discomfort.

SUMMARY

Generally, the present disclosure relates to low fringing film coatings, their manufacture, and their use on optical bodies or other devices. Improved coatings, methods and apparatus for reducing interference colors known as Newton rings are described. The coating includes a transparent polymeric layer having a surface, and a plurality of projections extending away from the surface. The transparent polymeric layer can be disposed adjacent an optical element and within a display housing to form an optical display. The projections can have a mean height of 0.05 to 1 µm and a mean distance between projections of 0.5 to 2 mm. The coating can be produced by coating a polymeric composition onto a substrate. The polymeric composition includes a polymeric material, a good solvent for the polymeric material and a poor solvent for the polymeric material. The solvents are at least partially evaporated to form the low fringing transparent polymeric layer.

In an illustrative embodiment, a method of forming an optical film is described. This method includes the steps of coating a polymeric composition onto a substrate. The polymeric composition includes a polymeric material, a polar solvent and a non-polar solvent. Then, at least a portion of the polar and non-polar solvents are evaporated forming a transparent polymeric layer. The transparent polymeric layer has a surface and a plurality of projections that extend away from the surface. The projections have a mean height of 0.05 to 1 µm and a mean distance between projections of 0.5 to 2 mm.

In another illustrative embodiment, a method of forming an optical film is described. This method includes the steps of coating a polymeric composition onto a substrate. The polymeric composition includes a polymeric material, a good solvent for the polymeric material and a poor solvent for the polymeric material. The polymeric material has a first Hildebrand's solubility parameter. The poor solvent has a second Hildebrand's solubility parameter. The first Hildebrand's solubility parameter differs from the second Hildebrand's solubility parameter by a value of at least 2. Then, at least a portion of the good solvent and the poor solvent are evaporated to form a transparent polymeric layer. The transparent polymeric layer has a surface and a plurality of projections that extend away from the surface. The projections have a mean height of 0.05 to 1 µm and a mean distance between projections of 0.5 to 2 mm.

The above summary of the present disclosure is not intended to describe each disclosed embodiment or every implementation of the present disclosure. The Figures, Detailed Description and Examples which follow more particularly exemplify these embodiments.

BRIEF DESCRIPTION OF THE DRAWINGS

The disclosure may be more completely understood in consideration of the following detailed description of various embodiments of the disclosure in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

The present disclosure is believed to be applicable to, for example, optical bodies (such as optical films) and their manufacture, as well as the use of the optical bodies in optical devices, such as optical displays (e.g., LCDs). While the present disclosure is not so limited, an appreciation of various aspects of the disclosure will be gained through a discussion of the examples provided herein.

For the following defined terms, these definitions shall be applied, unless a different definition is given in the claims or elsewhere in this specification.

The term "polymer" will be understood to include polymers, copolymers (e.g., polymers formed using two or more different monomers), oligomers and combinations thereof, as well as polymers, oligomers, or copolymers that can be formed in a miscible blend by, for example, coextrusion or reaction, including transesterification. Both block and random copolymers are included, unless indicated otherwise. The term "polymer" also includes polymer precursors such as monomers that are capable of being polymerized or crosslinked.

The term "polymeric material" will be understood to include polymers, as defined above, and other organic or inorganic additives, such as, for example, antioxidants, stabilizers, antiozonants, plasticizers, dyes, U.V. absorbers, hindered amine light stabilizers (HALS), and pigments.

The term "phr" refers to a unit of parts by weight of a component in a coating composition having 100 parts by weight of polymeric material.

The term "solvent" refers to a substance that is capable of at least partially dissolving another substance (solute) to form a solution or dispersion. A "solvent" may be a mixture of one or more substances.

The term "refractive index" is defined herein as the absolute refractive index of a material which is understood to be the ratio of the speed of electromagnetic radiation in free space to the speed of the radiation in that material. The refractive index can be measured using known methods and is generally measured using an Abbe Refractometer in the visible light region.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements.

Weight percent, percent by weight, % by weight, and the like are synonyms that refer to the concentration of a substance as the weight of that substance divided by the weight of the composition and multiplied by 100.

The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to a composition containing "a compound" includes a mixture of two or more compounds. As used in this specification and the appended claims, the term "or" is generally employed in its sense including "and/or" unless the content clearly dictates otherwise.

The present disclosure provides a low fringing coating. These coatings reduce or eliminate an optical interference fringing phenomena commonly known as "Newton's Rings." In some embodiments, the coatings are clear or transparent and can be used in conjunction with optical elements. In one embodiment, the coating can be termed a "hard coat" layer. Before giving a more detailed discussion of the chemistry of the present low fringing finish coating compositions, various illustrative products embodying the disclosure will be described in connection with the accompanying drawings.

Figure 1:
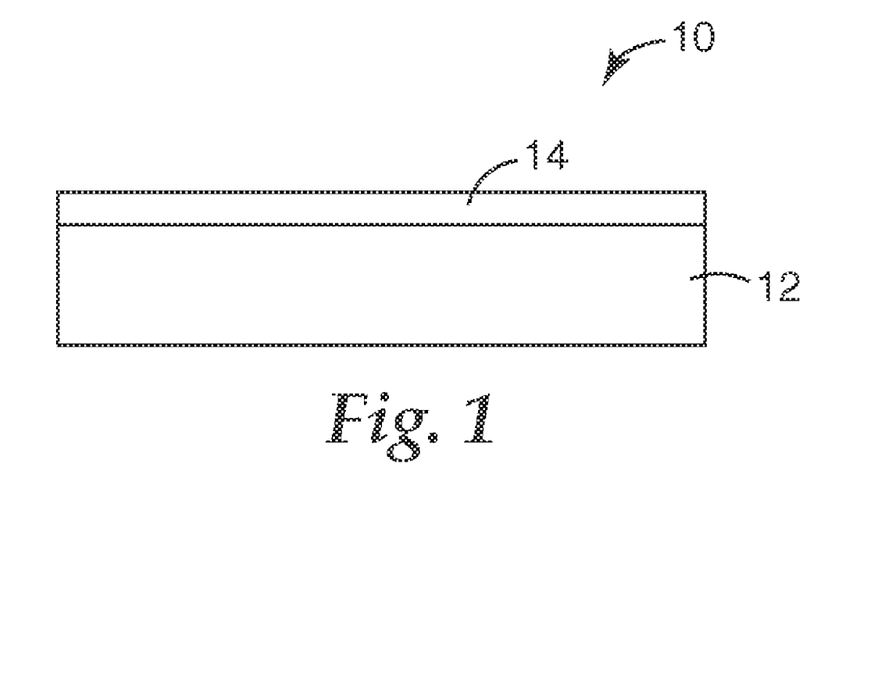
FIG. 1 shows a sectional view of an illustrative coated article.

FIG. 1 shows sectional view of an illustrative optical film 10. A low fringing coating layer 14 is disposed on a substrate 12. The substrate 12 can be composed of any useful material. The low fringing coating layer 14 can have any useful thickness such as, for example, 1 to 20 µm, 1 to 10 µm, 2 to 8 µm, or 4 to 6 µm.

The coating layer 14 can possess a particular haze value (i.e., light scattering). This haze value can be determined by measuring the haze of the coating with a hazemeter. A standard (ASTM) test method for haze is defined in ASTM D 1003-00. The haze value of the coating layer 14 can be in the range of 5% or less, or 2% or less, or 1% or less, or in the range from 0 to 3%, or in the range from 0 to 1%.

The coating layer 14 can possess a particular gloss value (i.e., surface reflectance). This gloss value can be determined by measuring the specular gloss of the coating at 60° with a gloss meter. A standard (ASTM) test method for specular gloss is defined in ASTM D 523-89. As used herein, the term "glossy" refers to a 60° gloss value of 90 or greater. The 60° gloss value of the coating layer 10 can be in the range of 130 or greater, or 150 or greater, or in the range from 130 to 200, or in the range from 160 to 190.

The coating layer 14 can posses a first refractive index. The substrate can posses a second refractive index. The first refractive index can differ from the second refractive index by a value from 0.05 to 0.25, or from 0.05 to 0.2, or from 0.1 to 0.2.

The coating layer 14 can have a plurality of projections that extend away from a surface of the coating layer 14. The plurality of projections provide the surface of the coating layer with an undulating topography. The undulating topography and/or projections can have a uniform (pattern) or non-uniform (random) distribution about the surface of the coating layer. The projections can have a mean height in the range of 0.05 to 1 µm or 0.1 to 1 µm. The projections can have a mean frequency or mean distance between projection peaks in the range of 0.2 to 4 mm, or from 0.3 to 3 mm, or from 0.5 to 2 mm. Topography of the coating layer 14 surface may be determined as shown in the Example section below.

The coating layer 14, reaction product thereof (i.e., cured coating composition) as well as the coated substrates and/or articles of the disclosure can be used on a variety of display and protective articles where durability (e.g., abrasion resistance) may be desired while maintaining optical clarity.

Various illuminated and non-illuminated display panels are known. Such displays include multi-character and especially multi-character, multi-line displays such as LCDs, plasma displays, front and rear projection displays, cathode ray tubes (CRTs), signage, as well as single-character or binary displays such as light emitting diodes (LEDs), signal lamps and switches. The light transmissive (i.e. exposed) substrate of such display panels may be referred to as a "lens."

Embodiments of the present disclosure may be useful for displays having a viewing surface that is susceptible to damage during normal use.

Figure 2:
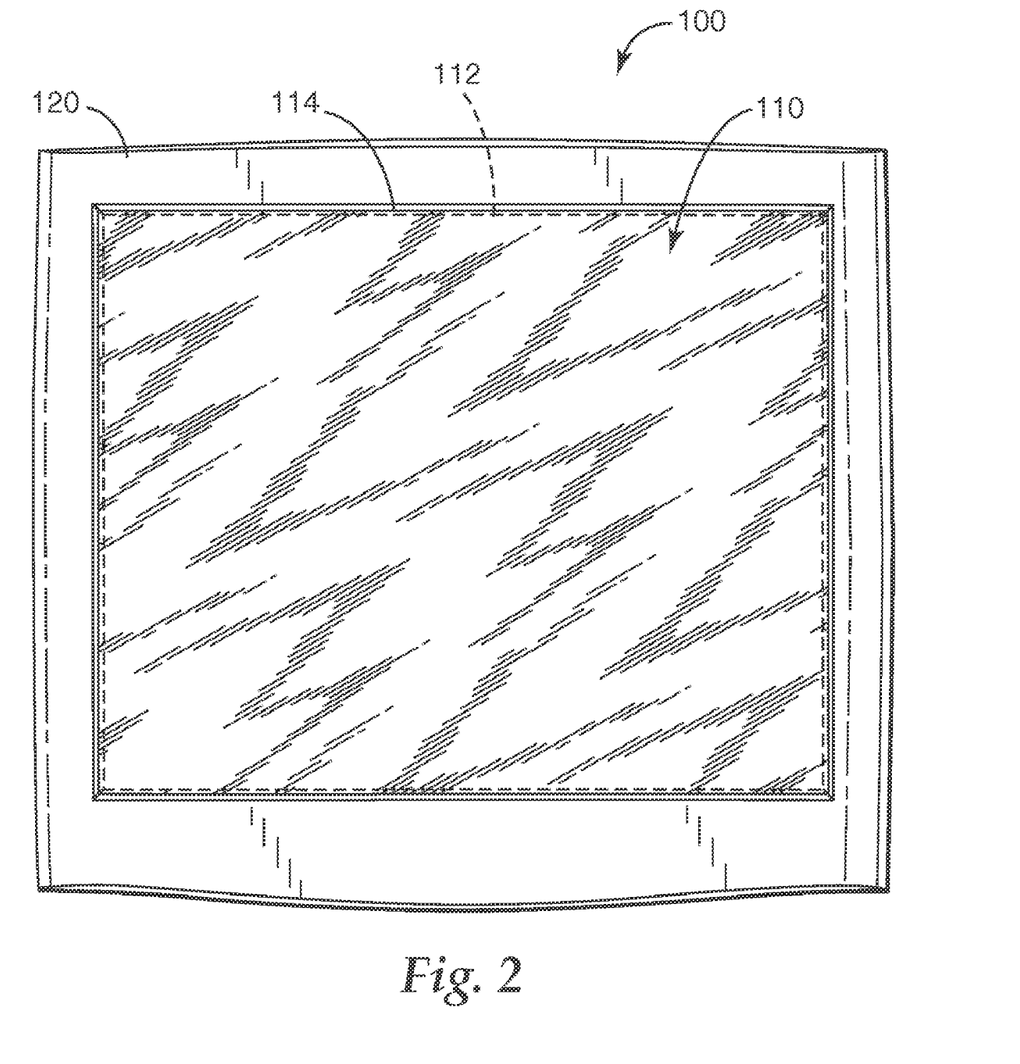
FIG. 2 is a schematic view of an illustrative display.

FIG. 2 is a schematic view of an illustrative display 100. The illustrative display 100 can be an illuminated or non-illuminated LCD. The display 100 includes an optical film 110 surrounded by a display housing 120. In this illustrative embodiment, the optical film 110 includes an optical element 112 such as, for example, a liquid crystal material substrate, and a low fringing coating layer 114 disposed on or adjacent the optical element 112. One or more optional layers can be disposed between the coating layer 114 and the optical element 112. The display 100 and optical film 110 can have any size or shape, as desired.

The low fringing coating composition, reaction product thereof (i.e. dried and cured coating composition) as well as the low fringing coated displays of the present disclosure can be employed in a variety of portable and non-portable information display devices including PDAs, cell phones (including combination PDA/cell phones), touch-sensitive screens, wrist watches, car navigation systems, global positioning systems, depth finders, calculators, electronic books, CD or DVD players, projection television screens, computer monitors, notebook computer displays, instrument gauges, instrument panel covers, signage such as graphic displays (including indoor and outdoor graphics, and the like), and the like. These devices can have planar viewing faces, or non-planar viewing faces such as the slightly curved face of a typical CRT. The display element can be located on or in close physical proximity to a viewing face of the information display device rather than being spaced an appreciable distance therefrom.

The low fringing coating composition, reaction product, and low fringing displays can be employed on a variety of other articles as well such as for example camera lenses, eyeglass lenses, binocular lenses, retroreflective sheeting, dry erase boards, floor films, automobile windows, building windows, train windows, boat windows, aircraft windows, vehicle headlamps and taillights, display cases, eyeglasses, watercraft hulls, road pavement markings, overhead projectors, stereo cabinet doors, stereo covers, furniture, bus shelter plastic, watch covers, as well as optical and magneto-optical recording disks, and the like.

Figure 3:
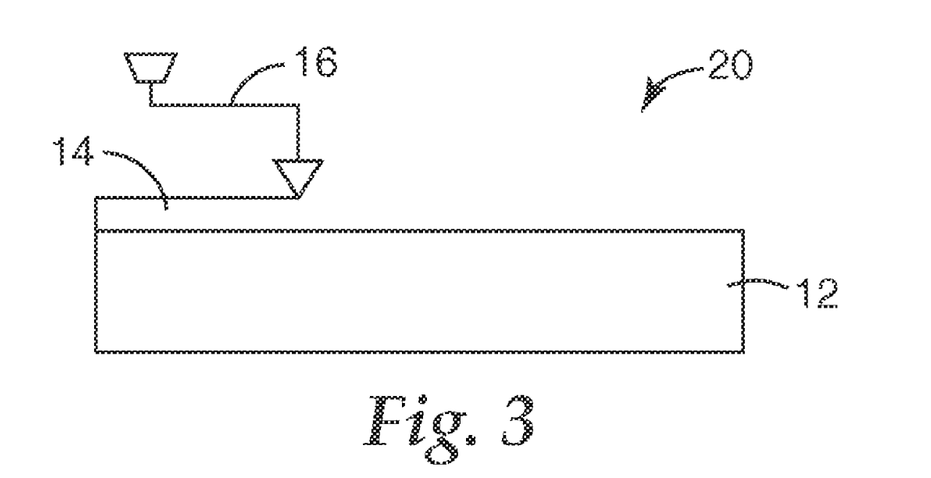
FIG. 3 is a schematic view of an illustrative process for forming a coating layer on a substrate.

FIG. 3 is a schematic view of an illustrative process 20 for forming a low fringing coating layer 14 on a substrate 12. The substrate 12 can be coated with a flowable coating composition via a coating apparatus 16 forming a layer of coating composition on the substrate. At least a portion of solvent present in the coating composition can be removed via, for example, evaporation to form the low fringing coating layer 14.

The substrate can be a surface of any of the above listed articles or the substrate can be a layer of material that can be disposed on any article. Suitable substrate materials include glass as well as thermosetting or thermoplastic polymers such as polycarbonate, poly(meth)acrylate (e.g., polymethyl methacrylate (PMMA), polyolefins (e.g., polypropylene (PP)), polyurethane, polyesters (e.g., polyethylene terephthalate (PET)), polyamides, polyimides, phenolic resins, cellulose diacetate, cellulose triacetate, polystyrene, styrene-acrylonitrile copolymers, epoxies, and the like. The substrate can be chosen based in part on the desired optical and mechanical properties for the intended use. Such mechanical properties can include flexibility, dimensional stability and impact resistance. The substrate thickness can also depend on the intended use. Substrate thicknesses can be less than 0.5 mm, or from 0.02 to about 0.2 mm. Self-supporting polymeric films are useful. In some embodiments, the substrate is made from polyesters such as PET or polyolefins such as PP (polypropylene), PE (polyethylene) and PVC (polyvinyl chloride). In one embodiment, the substrate is a polyester material having a refractive index of 1.65. The polymeric material can be formed into a substrate film using conventional filmmaking techniques such as by extrusion and optionally uniaxial or biaxial orientation of the extruded film. The substrate can be treated to improve adhesion between the substrate and the hardcoat layer, e.g., chemical treatment, corona treatment such as air or nitrogen corona, plasma, flame, or actinic radiation. If desired, an optional tie layer or primer can be applied to the substrate and/or hardcoat layer to increase the interlayer adhesion. In the case of articles such as display panels and protective articles, the substrate is light transmissive, meaning light can be transmitted through the substrate such that the display can be viewed. Both transparent (e.g., gloss) and matte light transmissive substrates are employed in display panels.

A further description will now be given of the chemistry of the low fringing coating layer. These coating compositions include a polymer and a solvent system. As used herein, the term "polymer" is understood to include polymer precursors, such as monomers that can be polymerized or cross-linked to form a polymer. The polymer can be any suitable transparent thermoplastic or thermosetting polymer. A partial illustrative listing includes polyester resins, acrylic resins, polyester acrylate resins, polyurethane acrylate resins, epoxy acrylate resins, cellulose resins, acetyl resins, vinyl resins, polyethylene resins, polystyrene resins, polypropylene resins, polyamide resins, polyimide resins, melamine resins, phenol resins, silicone resins, fluorine resins, and the like. In one illustrative embodiment, the polymer is a polyacrylate having a refractive index of 1.5.

The polymer can optionally include nanoparticles. These nanoparticles can be surface modified. The term "surface modified nanoparticles" refers to nanoparticles, each with a modified surface such that the nanoparticles provide a stable dispersion. The term "stable dispersion" is defined herein as a dispersion in which the colloidal nanoparticles do not agglomerate after standing for a period of time, such as about 24 hours, under ambient conditions, e.g., room temperature (about 20-22° C.), and atmospheric pressure, without extreme electromagnetic forces. In one embodiment, an illustrative polymer composition including surface modified nanoparticles is described in U.S. Pat. No. 5,104,929 and U.S. Pat. No. 5,677,050.

Surface modified colloidal nanoparticles can be present in the polymer coating in an amount effective to enhance the durability of the article or optical element. The surface modified colloidal nanoparticles described herein can have a variety of desirable attributes, including, for example; nanoparticle compatibility with polymer systems such that the nanoparticles form stable dispersions within the polymer systems, surface modification can provide reactivity of the nanoparticle with the resin system making the composite more durable, properly surface modified nanoparticles added to polymer systems can provide a low impact on uncured composition viscosity. A combination of surface modifications can be used to manipulate the uncured and cured properties of the composition. Surface modified nanoparticles can improve optical and physical properties of the coating such as, for example, improve resin mechanical strength, minimize viscosity changes while increasing solid volume loading in the resin system, and maintain optical clarity while increasing solid volume loading in the resin system.

The surface modified colloidal nanoparticles can be oxide particles having a particle size or associated particle size of greater than 1 nm and less than 100 nm. Their measurements can be based on transmission electron miscroscopy (TEM). The nanoparticles can include metal oxides such as, for example, alumina, tin oxides, antimony oxides, silica, zirconia, titania, mixtures thereof, or mixed oxides thereof. Surface modified colloidal nanoparticles can be substantially fully condensed.

Silica nanoparticles can have a particle size from 5 to 75 nm or 10 to 30 nm or 20 nm. Silica nanoparticles can be present in the coating composition in an amount from 10 to 100 phr, or 25 to 80 phr, or 30 to 70 phr. Silicas for use in the materials of the present disclosure are commercially available from Nalco Chemical Co. (Naperville, Ill.) under the product designation NALCO COLLOIDAL SILICAS. For example, silicas include NALCO products 1040, 1042, 1050, 1060, 2327 and 2329. Suitable fumed silicas include for example, products sold under the tradename AEROSIL series OX-50, -130, -150, and -200 available from DeGussa AG, (Hanau, Germany), and CAB-O-SPERSE 2095, CAB-O-SPERSE A105, CAB-O-SIL M5 available from Cabot Corp. (Tuscola, Ill.)

Surface-treating the nano-sized particles can provide a stable dispersion in the polymeric resin. Preferably, the surface-treatment stabilizes the nanoparticles so that the particles will be well dispersed in the polymerizable resin and results in a substantially homogeneous composition. Furthermore, the nanoparticles can be modified over at least a portion of its surface with a surface treatment agent so that the stabilized particle can copolymerize or react with the polymerizable resin during curing.

The nanoparticles of the present disclosure can be treated with a surface treatment agent. In general a surface treatment agent has a first end that will attach to the particle surface (covalently, ionically or through strong physisorption) and a second end that imparts compatibility of the particle with the resin and/or reacts with resin during curing. Examples of surface treatment agents include alcohols, amines, carboxylic acids, sulfonic acids, phosphonic acids, silanes and titanates. The preferred type of treatment agent is determined, in part, by the chemical nature of the metal oxide surface. Silanes are preferred for silica and other siliceous fillers. The surface modification can be done either subsequent to mixing with the monomers or after mixing. It may be preferred in the case of silanes to react the silanes with the particle or nanoparticle surface before incorporation into the resin. The required amount of surface modifier is dependant upon several factors such particle size, particle type, modifier molecular wt, and modifier type. In general it may be preferred that approximately a monolayer of modifier is attached to the surface of the particle. The attachment procedure or reaction conditions required also depend on the surface modifier used. For silanes it may be preferred to surface treat at elevated temperatures under acidic or basic conditions for from 1-24 hr approximately.

Representative embodiments of surface treatment agents suitable for the coating compositions include compounds such as, for example, isooctyl trimethoxy-silane, N-(3-triethoxysilylpropyl)methoxyethoxyethoxyethyl carbamate (PEG3TES), Silquest A1230, N-(3-triethoxysilylpropyl) methoxyethoxyethoxyethyl carbamate (PEG2TES), 3-(methacryloyloxy)propyltrimethoxysilane, 3-acryloxypropyltrimethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris(2-methoxyethoxy)silane, styrylethyltrimethoxysilane, mercaptopropyltrimethoxysilane, 3-glycidoxypropyltrimethoxysilane, acrylic acid, methacrylic acid, oleic acid, stearic acid, dodecanoic acid, 2-[2-(2-methoxyethoxy)ethoxy]acetic acid (MEEAA), beta-carboxyethylacrylate, 2-(2-methoxyethoxy)acetic acid, methoxyphenyl acetic acid, and mixtures thereof.

The surface modification of the particles in the colloidal dispersion can be accomplished in a variety of ways. The process involves the mixture of an inorganic dispersion with surface modifying agents. Optionally, a co-solvent can be added at this point, such as, for example, 1-methoxy-2-propanol, ethanol, isopropanol, ethylene glycol, N,N-dimethylacetamide and 1-methyl-2-pyrrolidinone. The co-solvent can enhance the solubility of the surface modifying agents as well as the surface modified particles. The mixture comprising the inorganic sol and surface modifying agents is subsequently reacted at room or an elevated temperature, with or without mixing. In one method, the mixture can be reacted at about 85° C. for about 24 hours, resulting in the surface modified sol. In one method, where metal oxides are surface modified, the surface treatment of the metal oxide can preferably involve the adsorption of acidic molecules to the particle surface. The surface modification of the heavy metal oxide preferably takes place at room temperature.

The coating compositions also include a solvent system. The solvent system is one that dissolves the polymer (as defined herein) of the coating composition, but upon evaporation, the polymer precipitates out of solution such that there is at least partial phase separation. The solvent system includes a mixture of good and poor solvents for the polymer. A "good solvent" is one that dissolves the polymer over a broad concentration range and from which the polymer does not precipitate upon dry down (i.e., upon evaporation of the solvent). In contrast, a "poor solvent" is one that may dissolve the polymer, although it would be over a limited concentration range, from which the polymer precipitates upon dry down. That is, as the solvent system evaporates, the composition becomes enriched in a poor solvent for the polymer and the polymer phase separates (i.e., precipitates) to form a low fringing surface, rather than remaining homogeneous and forming an absolute smooth film.

The composition may need to be heated slightly to ensure that the polymer remains in solution until after it is coated out. If coated from the appropriate combination of good and poor solvents, the low fringing coating of the present invention is sufficiently stable and adherent such that cracks do not form either during or after coating, thereby forming a substantially uniformly distributed coating.

The solvent system includes at least one good solvent for the polymer and at least one poor solvent for the polymer. The prediction of solubility of various solutes (e.g., polymer) in various solvents (e.g., good or poor solvents) has been that "like dissolves like." For example, a polar solute will be soluble in a polar solvent and not soluble in a non-polar solvent. However, this may be overly simple. A more universal approach was developed by Hildebrand who assumed that the mutual solubility of components depends on the cohesive pressure, c. The square root of cohesive pressure is Hildebrand's solubility parameter, δ. Hildebrand's solubility parameter δ value for each solvent can be determined via the following formula:

$$\sqrt{\frac{(\Delta H_v - RT)}{V_m}}$$

where:
 $\Delta H_v$ is the heat of vaporization;
 R is the gas constant, T is the temperature;
 $V_m$ is the molar colume of solvent=M/d;
 M is the molecular mass of solvent; and
 d is the density of solvent.

A solvent and a solute having the same solubility parameter value are very soluble in one another. As the solvent solubility parameter value begins to differ from the solute solubility parameter value, they become less compatible and thus less soluble in one another.

As defined herein, a "good solvent" is a material that has a Hildebrand solubility parameter value that differs from the polymer Hildebrand solubility parameter value by less than 2. As defined herein, a "poor solvent" is a material that has a Hildebrand solubility parameter value that differs from the polymer Hildebrand solubility parameter value by 2 or greater, or 3 or greater, or 4 or greater, or from 2 to 8, or from 2 to 6, or from 2 to 5, or from 2 to 4, or from 2 to 3, or from 3 to 4.

In some embodiments, the good solvent can be a polar solvent or non polar solvent. The good solvent can be any material that can solublize the polymer. The poor solvent can be polar solvent or non polar solvent. In one embodiment, a polar solvent is used for the good solvent, and a non-polar solvent is used as the poor solvent.

The good solvent can be present in the coating composition in any useful amount. The poor solvent can be present in amount less than the good solvent. The ratio of the good solvent to the poor solvent can be determined by one skilled in the art without undue experimentation. In some embodiments, the poor solvent can be present in the coating composition in a range from 1 to 100 phr, or 10 to 90 phr, or 20 to 85 phr.

The poor solvent can have a boiling point that is greater than the good solvent. In some embodiments, the poor solvent boiling point can be greater than the good solvent boiling point by a value in the range of 25 degrees or greater, or 35 degrees or greater, or 50 degrees or greater, or from 25 to 100 degrees.

In an illustrative embodiment, a polymer composition described in U.S. Pat. No. 5,104,929 and U.S. Pat. No. 5,677,050 is used as the solute; the good solvent can be polar solvent such as, isopropyl alcohol or ethyl acetate, for example. The poor solvent can be non-polar solvent such as a linear or branched alkane having seven to twelve carbon atoms, or eight to ten carbon atoms, or eight or nine carbon atoms, such as octane or nonane, for example.

After the coating composition is coated on a substrate, at least a portion of the solvent system is removed to form the low fringing coating. While not wishing to be bound to any particular theory, it is thought that the inclusion of the poor solvent in the coating composition aids in forming the desired surface topography described herein by creating surface flows as the good and poor solvents are removed from the coating.

Solvents can be removed from the coating composition by evaporation to dry down the coating composition and form the coating layer on the substrate. Both density and surface tension change during drying of the coating layer, since both are a function of temperature and change in composition. Evaporation of the volatiles (good and poor solvents) will lead to a temperature gradient and a volatile gradient through the coating layer. Normal turbulence in the surrounding air can give rise to local gradients along the coating layer surface. Such disturbances will tend to equalize, thereby causing flow. By this flow the equilibrium situation may be reestablished or it may itself give rise to a new disturbance because of the gradients down through the film, subsequently leading to a stable flow pattern. Convention cells or Bénard cells are the results of a situation of this type. In the past, these types of surface flows are usually avoided as they result in an undulating surface topography typically considered surface defects.

However, it has been found that the addition of a poor solvent to these coating compositions allows for selection of a particular surface topography. The undulating topography and/or projections can be formed where the projections have a mean height in the range of 0.05 to 1 μm or 0.1 to 1 μm. The projections can have a mean frequency or mean distance between projections in the range of 0.2 to 4 mm or from 0.5 to 2 mm. This topography on coatings, having a thickness in the range of 1 to 10 μm and a refractive index difference from the substrate of at least 0.05, has been found to provide a coating that is glossy, has low haze and reduces or eliminates Newton's Rings.

Advantages of the disclosure are illustrated by the following examples. However, the particular materials and amounts thereof recited in these examples, as well as other conditions and details, are to be interpreted to apply broadly in the art and should not be construed to unduly limit the disclosure.

Methods

Reflectance measurements were conducted using a Lambda 900 spectrophotometer (available from Perkin Elmer Instruments of Shelton, Conn.) using the reflectance mode.

Haze was measured according to ASTM D1003-00 using a Gardner Haze-gard model 4725 (available from BYK-Gardner of Columbia, Md.).

Gloss was measured at an angle of 60° according to ASTM D 523-89 using a Gardner Haze-gloss Reflectometer model no. 4600 (available from BYK-Gardner of Columbia, Md.).

Ellipsometry was carried out on samples of the coating randomly oriented with respect to the coating direction. For each coating sample, the profile of the surface of the dried and cured coating was measured using a Wyko NT 3300 Ellipsometer (available from Wyko Corporation of Tucson, Ariz.) in vertical scanning-interferometry (VSI) mode.

Fringing (Newton's Rings) was examined by visual examination.

EXAMPLES

Example 1

The CER1 pre-solution was made as described in U.S. Pat. No. 5,677,050, column 10, lines 25 to 39 inclusive.

The hardcoat premix as shown in Table 1 below was made using the procedure described in Example 1 of U.S. Pat. No. 5,677,050, column 10, lines 60 to 64 inclusive, by mixing the CER1 with TINUVIN 292, isopropanol and Irgacure 184 and filtering. However, the relative amounts used are given in Table 1.

To the hardcoat premix were added the additional components of ethyl acetate and 21 phr of nonane as shown in Table 1 to make up a liquid coating mixture.

The liquid coating composition was coated onto 100 μm gauge (four mil) polyester film using a slot-fed die coater at a wet coating thickness of approximately 17 to 18 μm at a web speed of approximately nine meters per minute (30 feet/minute) to provide a dry thickness of 4 μm. The coated web was dried by passing through a gap dryer (as described in U.S. Pat. Nos. 5,581,905; 5,694,701 and 6,134,808) set at approximately 60° C. (residence time in the gap dryer was approximately 20 seconds). Then the web was further dried by passing through a conventional drying oven set at 70° C. (oven residence time was approximately 40 seconds).

The coating was cured inline on the polyester web using a Fusion Processor with a 600-watt H bulb (both available from Fusion UV Systems of Gainsburg, Md.). The result was a clear glossy hardcoat on a polyester web.

Figure 4:
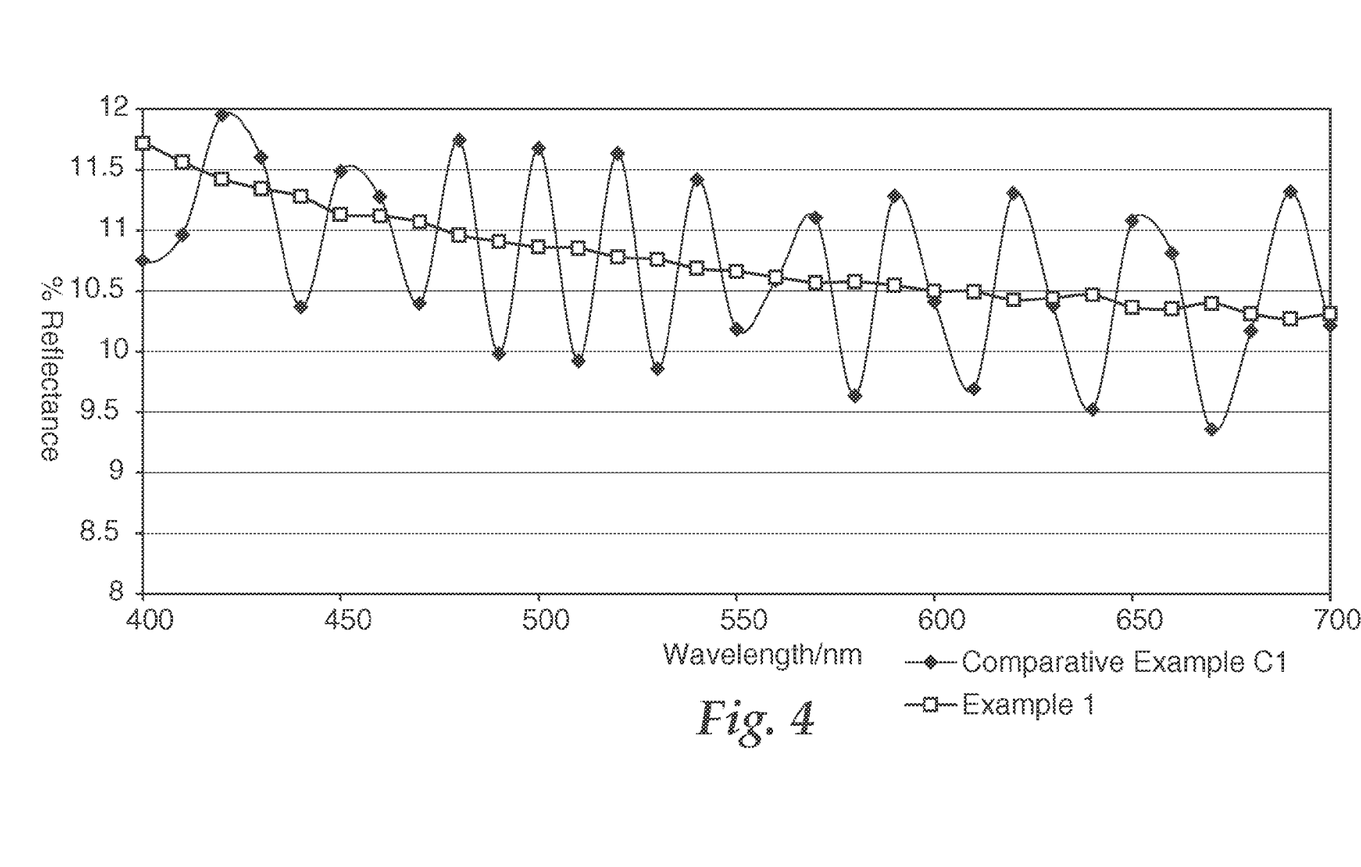
FIG. 4 is reflectance spectra of Example 1 and Example C1.
Figure 5A:
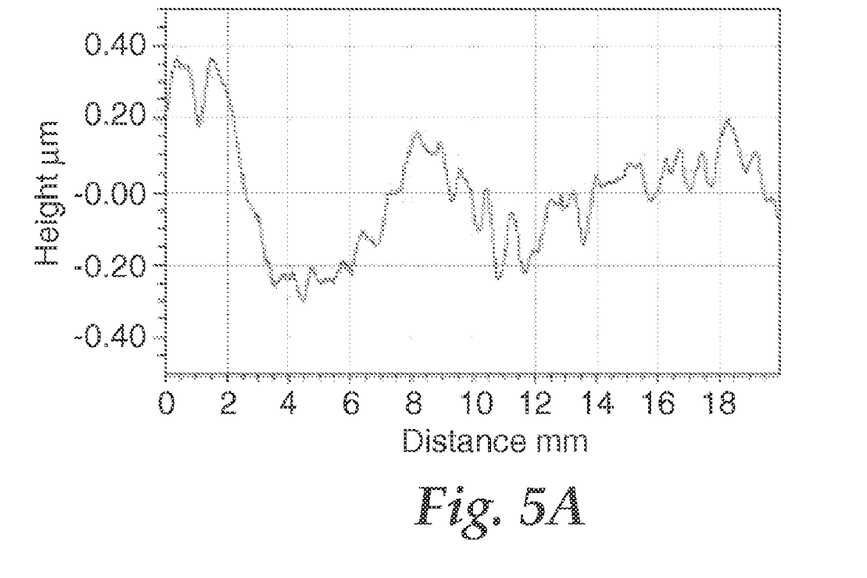
FIGS. 5A and 5B are ellipsometry profiles of Example 1.
Figure 5B:
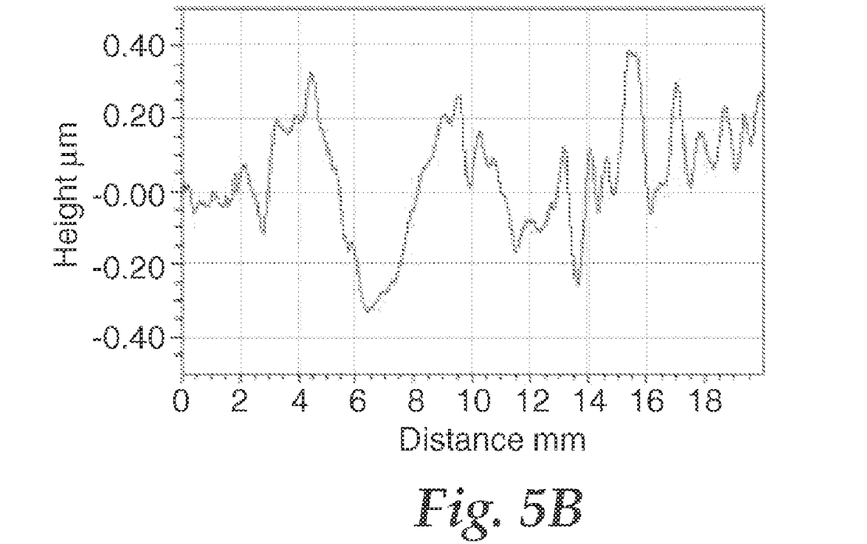

A visible light reflectance spectrum was run on the cured hardcoat. The resulting spectrum is shown in FIG. 4 (superimposed with that of the cured hardcoat from Comparative Example C1). Haze and 60° gloss were measured. The results are given in Table 1. Ellipsometry was carried out on this material. The thickness profile as measured by ellipsometry is shown in FIG. 5A in an X direction and FIG. 5B in a Y direction. The coating was visually examined for fringing.

Comparative example C1

The preparation of the liquid coating mixture and the coating were carried out as described in Example 1, except that before coating the only additional components added to the hardcoat premix was ethyl acetate and nonane was not included in the liquid coating formulation of Comparative Example C1. The formulation for this liquid coating mixture without nonane is given in Table 1.

Figure 6A:
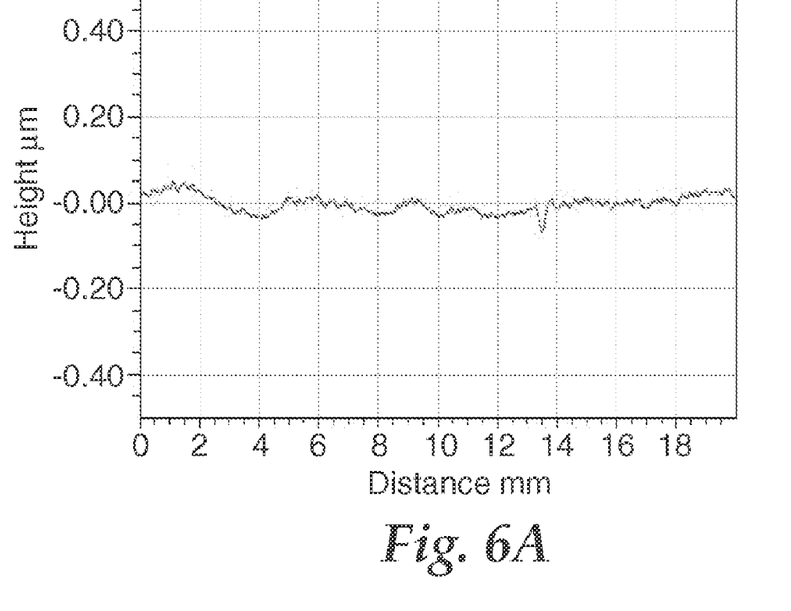
FIGS. 6A and 6B are ellipsometry profiles of Example C1.
Figure 6B:
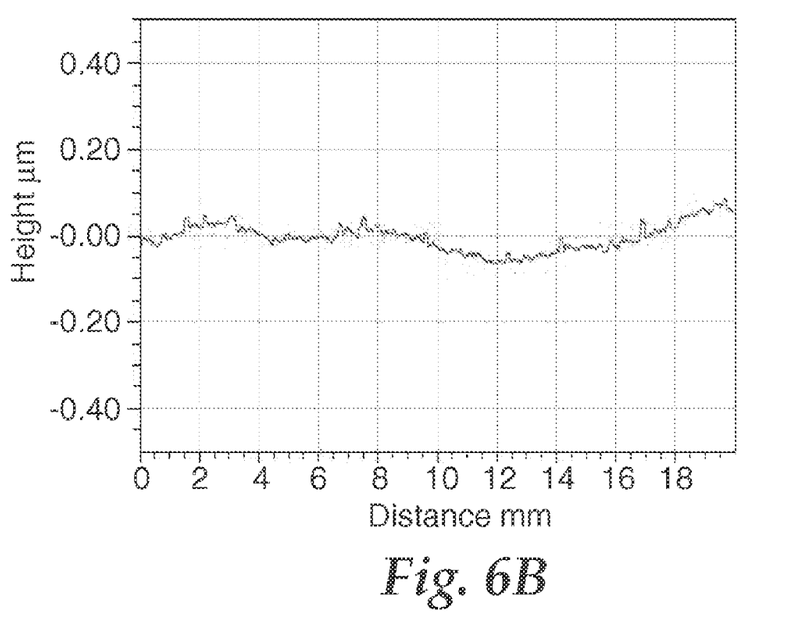

A reflectance spectrum was run on this cured coating. The resulting spectrum is shown in FIG. 4. Haze and gloss were measured. The measurements are given in Table 1. Elipsometry measurements were also made—the thickness profile is shown in FIG. 6A in an X direction and FIG. 6B in a Y direction. The coating was examined visually for fringing.

TABLE 1

| Liquid Coating Mixture premixes | | Individual Liquid Coating Mixture Components | | | Amount (grams) | |
|---|---|---|---|---|---|---|
| | | Available from | Name | Details | Example 1 | Comparative Example C1 |
| Hardcoat premix | CER1 | Sartomer (Exton, PA) | SARTOMER SR 444 | Pentaerythritol tri/tetra acrylate (PETA) | 51 | 51 |
| | | 40% Aqueous | | Acrylated silica | Reaction product of | 37 | 37 |

TABLE 1-continued

| Liquid Coating Mixture premixes | Individual Liquid Coating Mixture Components | | | Amount (grams) | |
| --- | --- | --- | --- | --- | --- |
| | Available from | Name | Details | Example 1 | Comparative Example C1 |
| | colloidal silica available as NALCO 2327 from Nalco Chemical Co. (Naperville, IL) 3-methacryloyl oxypropyl trimethoxysilane available as Z6030 (A-174) from Dow Corning Co. (Midland, MI) | | 40% aqueous colloidal silica with 3-methacryloyl oxypropyl trimethoxysilane (Z6030) | | |
| | NNDMA available from Sigma-Aldrich (Saint Louis, MO) | N,N-Dimethylacrylamide (NNDMA) | | 8 | 8 |
| | Ciba Geigy (Tarrytown, NY) | IRGACURE 184 | 1-Hydroxy-cyclohexyl-phenyl ketone | 2.4 | 2.4 |
| | | TINUVIN 292 | Bis (pentamethyl-1,2,2,6,6 piperidinyl-4) decanoate | 2 | 2 |
| | Sigma-Aldrich | | Isopropanol | 94 | 94 |
| | | | Phenothiazine | 0.005 | 0.005 |
| | | | Butylated hydroxytoluene (BHT) | 0.04 | 0.04 |
| | | | Deionized water | 6 | 6 |
| Additional components | Sigma-Aldrich | | Ethyl acetate | 200 | 200 |
| | | | Nonane | 12.4 | 0 |
| Test | | | Gloss | 180 | 178 |
| | | | Haze | 0.55% | 1.40% |

Discussion

As can be seen in FIG. 4, the visible light reflectance spectrum of the hardcoat of Comparative Example C1 made without nonane shows clearly visible interference fringes with a periodic variance of almost 2% in reflectance. The spectrum of the hardcoat from Example 1 shows that this hardcoat, made from a liquid coating formulation that included nonane, had an extremely low amount of fringing with an average variance in reflectance of less than 0.2%. The reflectance spectrum results were also confirmed visually. The hardcoat material from Example 1 showed no noticeable interference fringes. The material from the Comparative Example C1 showed interference fringes, which were visible as rainbow patterns when the hardcoat was examined in reflected light at various angles.

As seen in Table 1, Comparative Example C1 exhibited a haze of 1.40% while Example 1 showed a haze of only 0.55%. So, while fringing was reduced (improved) by the addition of the nonane, haze was not deleteriously affected. The results in Table 1 also show that gloss was retained.

As can be seen from FIGS. 5A, 5B and 6A, 6B the hardcoat from Comparative Example C1 made without nonane (FIG. 6A, 6B) had projections with a mean height of about 0.1 μm and a distance between peaks of about 6 mm apart. The hardcoat from Example 1 made from the liquid coating formulation containing the nonane (FIG. 5A, 5B) exhibited surface projections of about 0.2 μm in height and about 1 mm apart.

Examples 2, 3, 4 and Comparative Example C2

These examples show the effects of varying the amount of nonane in the liquid coating mixture.

A hardcoat premix having the same formulation (and made in the same way) as that used in Example 1 and Comparative Example C1 was used to make up the liquid coating mixtures of these Examples 2, 3, 4 and Comparative Example C2. The hardcoat premix was mixed with ethyl acetate and nonane in the amounts indicated in Table 2 to give liquid coating mixtures.

TABLE 2

| | Amounts(grams) | | |
| --- | --- | --- | --- |
| Example | Hardcoat premix | Ethyl acetate | Nonane |
| C2 | 50 | 50 | 0 |
| 2 | 49 | 49 | 1.3 |
| 3 | 49 | 49 | 2.7 |
| 4 | 48 | 48 | 4 |

The four liquid coating mixtures were coated onto polyester (Teijin 618 PET available from DuPont du Nemours of Wilmington, Del.) at a wet thickness of approximately 33 μm using a wire-wrapped rod to provide a dry thickness of 5 μm. The coated web was dried for 15 seconds at room temperature and two minutes at 100° C. in a conventional forced air oven. All four coated and dried hardcoats were cured by passing the uncured hardcoats at 5.5 meters/minute (18 feet/minute) through a Light Hammer 6 cure unit (available from Fusion UV Systems of Gainsburg, Md.) fitted with a 500-watt D bulb.

Reflectance measurements were conducted on the cured coatings using a Lambda 900 spectrophotometer in reflectance mode. The results are shown in FIG. 7.

Discussion

Figure 7:
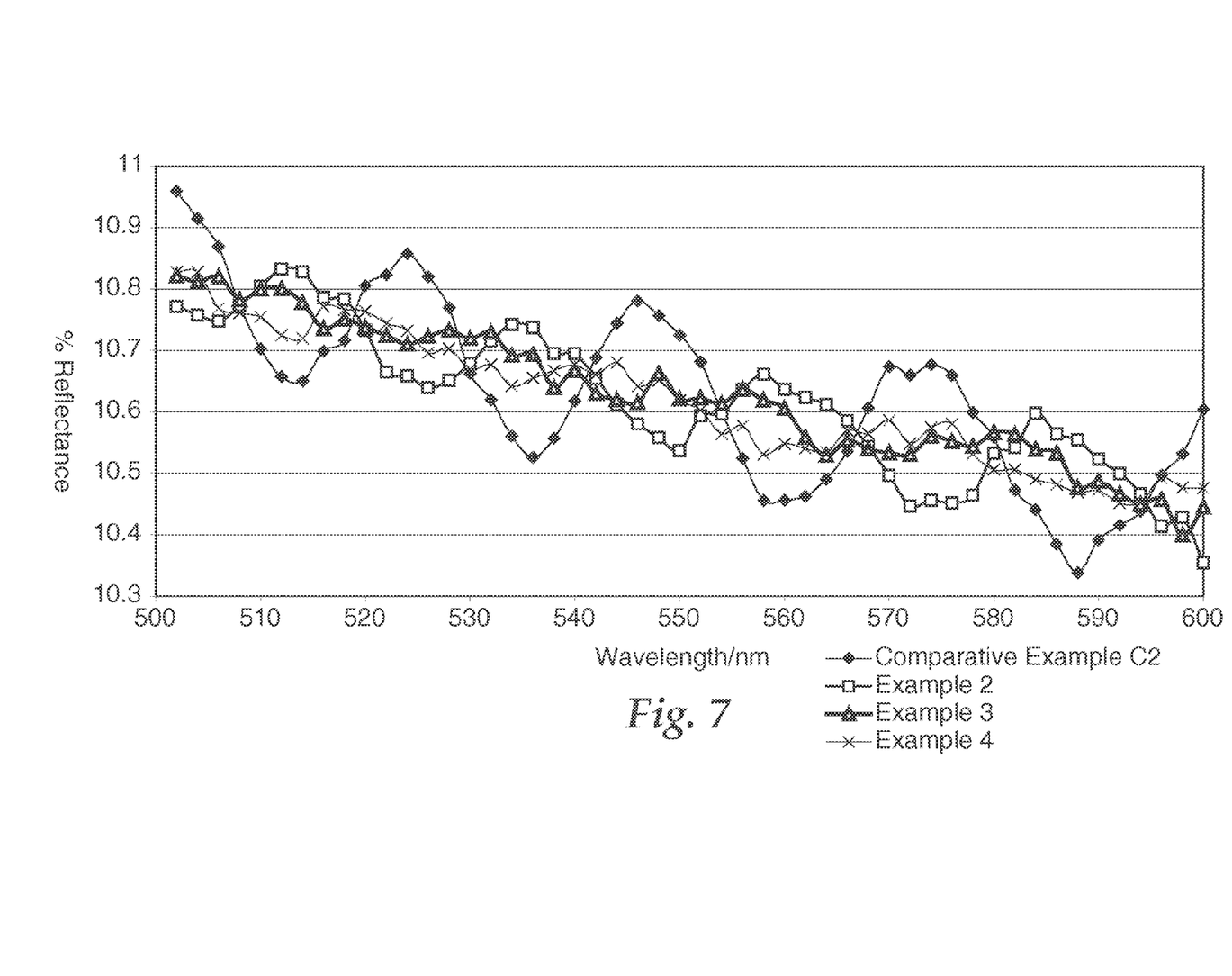
FIG. 7 is reflectance spectra of Examples 2, 3, 4 and Example C2.

FIG. 7 shows that as increasing amounts of nonane were added to the hardcoat premixes to make liquid coating mixtures, the resulting hardcoats showed decreasing fringing the greater the amount of nonane added. This was also observed visually, where the hardcoat of Example 5A, 5B showed no fringing, that of Examples 3 and 2 showed little fringing (Example 2 showed more than Example 3), and Comparative Example C2 showed unacceptably large amounts of fringing visible as rainbow patterns.

Examples 5 and 6, And Comparative Examples C3 and C4

The liquid coating mixture used in Example 5 was similar to that used in Example 1 except that instead of adding nonane to the hardcoat premix, octane was added. Comparative Example C3 was the control for Example 5, and is a repeat of Comparative Example C1, wherein the liquid coating mixture contained neither nonane nor octane.

The hardcoat from Example 6 was similar to that in Example 5 and was also coated from a liquid coating mixture that contained octane. However, no functionalized silica was added in Example 6. Comparative example C4 was carried out in the same manner as Example 6 except that no octane was added. Therefore the liquid coating mixture used in Comparative Example C4 contained neither octane nor functionalized silica. Furthermore, the coating liquid of Comparative Example C4 did not contain nonane.

The coating solutions for Example 5 and Comparative Example C3 were made up in the same manner as that of the coating solution for Example 1 except with the materials and quantities given in Table 3.

Example 6 was made in a similar manner to that of Example 5 except that instead of using hardcoat premix, pentaerythritol tri/tetra acrylate was used in its place. Comparative Example C4 was made in the same way but without octane. The formulations of the liquid coating mixtures used in Example 6 and Comparative Example C4 are shown in Table 3.

The liquid coating mixtures of Table 3 were coated, dried and cured into hardcoats as follows: The liquid coating mixtures were coated onto 100 μm gauge (four mil) polyester film using a wire-wrapped rod to give a dry coating thickness 4 μm. They were dried in a conventional convective air oven for one minute at 100° C. The dried coatings were then cured by passing the uncured hardcoats at six meters/minute (20 feet/minute) through a Light Hammer 6 cure unit (available from Fusion UV Systems of Gainsburg, Md.) fitted with a 500-watt D bulb to give glossy transparent hardcoats on a polyester base film.

Figure 8:
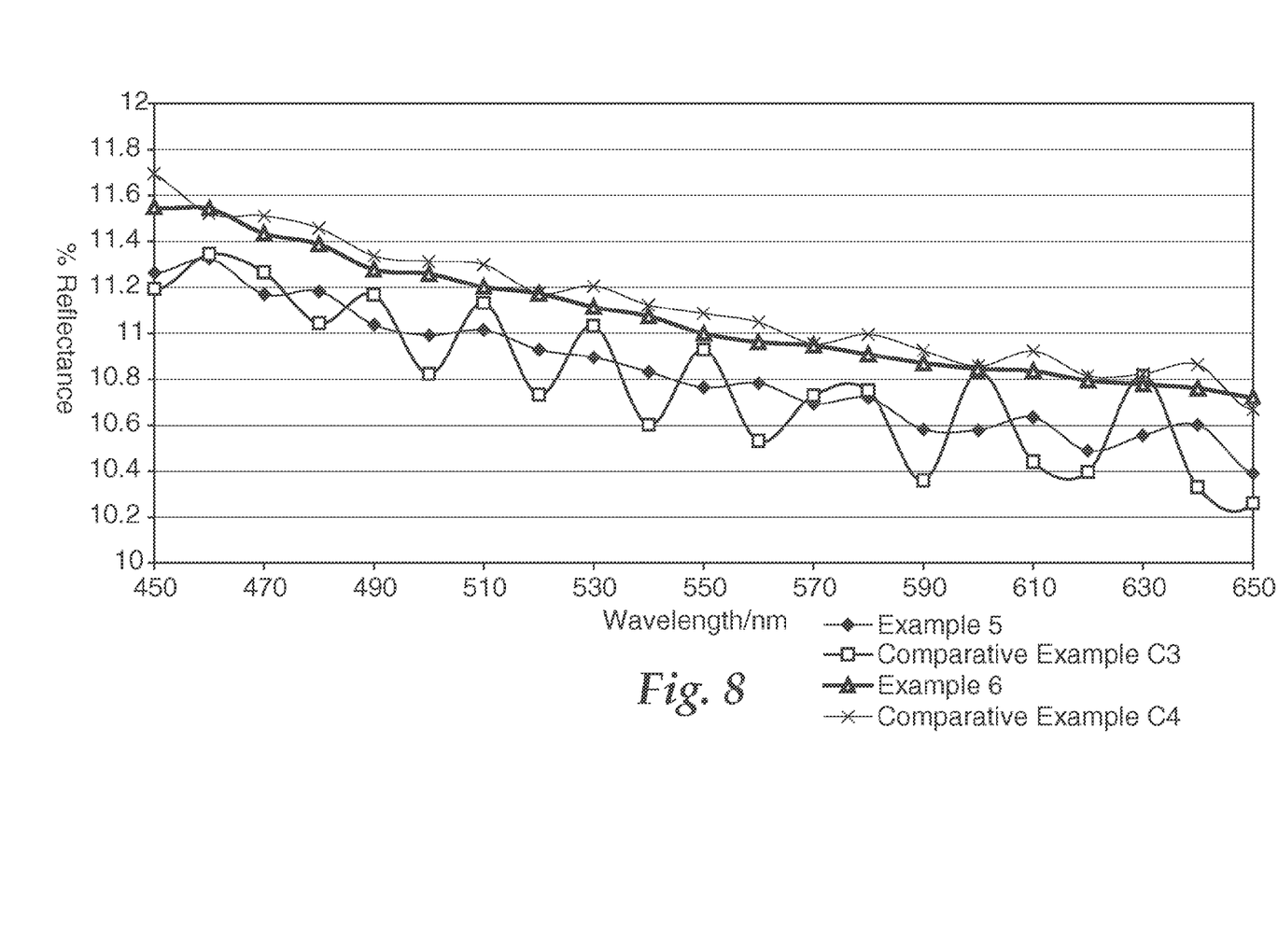
FIG. 8 is reflectance spectra of Examples 5, 6 and Example C3, C4.

The 60° gloss and the haze of the four materials were measured and results are included in Table 3. The four materials were examined visually for fringing. Reflectance spectra was run on the hardcoats from Examples 5 and 6, and Comparative Examples C3 and C4—the four spectra are shown in FIG. 8.

TABLE 3

| Liquid Coating Mixture | | Amount (grams) | | | |
|---|---|---|---|---|---|
| | Components Name | Example 5 | Comparative Example C3 | Example 6 | Comparative Example C4 |
| Hardcoat premix | SARTOMER SR 444 | 51 | 51 | 98 | 98 |
| | Acrylated silica | 37 | 37 | 0 | 0 |
| | N,N-Dimethyl acrylamide | 8 | 8 | 0 | 0 |
| | IRGACURE 184 | 2.4 | 2.4 | 0 | 0 |
| | TINUVIN 292 | 2 | 2 | 0 | 0 |
| | Isopropanol | 94 | 94 | 100 | 100 |
| | Phenothiazine | 0.005 | 0.005 | 0 | 0 |
| | Butylated hydroxy toluene | 0.04 | 0.04 | 0 | 0 |
| | Deionized water | 6 | 6 | 0 | 0 |
| Additional components | Ethyl acetate | 0 | 50 | 0 | 50 |
| | Nonane | 0 | 0 | 0 | 0 |
| | Octane (Sigma-Aldrich) | 50 | 0 | 50 | 0 |
| | Lucirin TPO (BASF) | 0 | 0 | 2 | 2 |
| Measurements | Gloss | 181 | 179 | 183 | 183 |
| | Haze (%) | 0.35 | 0.34 | 0.35 | 0.34 |

Discussion

On visual examination, the materials from Examples 5 and 6 did not show any fringing while those of Comparative Examples C3 and C4 both showed undesirable fringing. As can be seen by the results in Table 3 gloss and haze were left largely unaffected by the addition of octane or the absence of the functionalized silica.

Similarly, also in FIG. 8, the spectrum of the hardcoat from Example 6 shows less fringing than that of the hardcoat of Comparative Example C4. Neither of these two hardcoats contained silica.

All references and publications cited herein are expressly incorporated herein by reference in their entirety into this disclosure. Illustrative embodiments of this disclosure are discussed and reference has been made to possible variations within the scope of this disclosure. These and other variations and modifications in the disclosure will be apparent to those skilled in the art without departing from the scope of the disclosure, and it should be understood that this disclosure is not limited to the illustrative embodiments set forth herein. Accordingly, the disclosure is to be limited only by the claims provided below.

We claim:

1. A method of forming a low fringing film comprising steps of:
coating a polymeric composition onto a substrate, the polymeric composition comprising a polymeric material, a polar solvent and a non-polar solvent; and
evaporating at least a portion of the polar solvent and the non-polar solvent to form a transparent polymeric layer;
wherein, the transparent polymeric layer has a surface and a plurality of projections that extend away from the surface, the projections having a mean height of 0.05 to 1 μm and a mean distance between projections of 0.5 to 2 mm, and further wherein the transparent polymeric layer comprises a haze of 5% or less.

2. The method according to claim 1, wherein the coating step comprises coating a polymeric composition onto a substrate, the polymeric composition comprising a polymeric material having a first Hildebrand's solubility parameter, a polar solvent, and a non-polar solvent having a second Hildebrand's solubility parameter, the first Hildebrand's solubility parameter differs from the second Hildebrand's solubility parameter by a value of at least 2.

3. The method according to claim 1, wherein the coating step comprises coating a polymeric composition onto a substrate, the polymeric composition comprising a polymeric material having a first Hildebrand's solubility parameter, a polar solvent, and a non-polar solvent having a second Hildebrand's solubility parameter, the first Hildebrand's solubility parameter differs from the second Hildebrand's solubility parameter by a value of at least 3.

4. The method according to claim 1, wherein the coating step comprises coating a polymeric composition onto a substrate, the polymeric composition comprising a polymeric material, a polar solvent and a non-polar solvent comprising a $C_7$ to $C_{12}$ alkane.

5. The method according to claim 1, wherein the coating step comprises coating a polymeric composition onto a substrate, the polymeric composition comprising a polymeric material, a polar solvent having a first boiling point and a non-polar solvent having a second boiling point, wherein the second boiling point is 25° C. or greater than the first boiling point.

6. The method according to claim 1, wherein the coating step comprises coating a polymeric composition onto a substrate, the polymeric composition further comprising inorganic particles having an average particle diameter of 5 to 75 nm.

7. The method according to claim 6, wherein the coating step comprises coating a polymeric composition onto a substrate, the polymeric composition further comprising 10 to 100 phr inorganic particles.

8. The method according to claim 1, wherein the coating step comprises coating a polymeric composition onto a substrate, the polymeric composition comprising 1 to 100 phr of the non-polar solvent.

9. The method according to claim 1, wherein the coating step comprises coating a polymeric composition onto a substrate, the polymeric composition comprising 20 to 85 phr of the non-polar solvent comprising a $C_8$ to $C_{12}$ alkane.

10. The method according to claim 1, wherein the substrate has a first refractive index, the transparent polymeric layer has a second refractive index and the first refractive index differs from the second refractive index by a value from 0.05 to 0.2.

11. A method of forming a low fringing film comprising steps of:
coating a polymeric composition onto a substrate, the polymeric composition comprising a polymeric material, a good solvent for the polymeric material and a poor solvent for the polymeric material, the polymeric material having a first Hildebrand's solubility parameter, the poor solvent having a second Hildebrand's solubility parameter, the first Hildebrand's solubility parameter differs from the second Hildebrand's solubility parameter by a value of at least 2;
evaporating at least a portion of the good solvent and the poor solvent to form a transparent polymeric layer;
wherein, the transparent polymeric layer has a surface and a plurality of projections that extend away from the surface, the projections having a mean height of 0.05 to 1 μm and a mean distance between projections of 0.5 to 2 mm, and further wherein the transparent polymeric layer comprises a haze of 5% or less.

12. The method according to claim 11, wherein the coating step comprises coating a polymeric composition onto a substrate, the polymeric composition further comprising inorganic particles having an average particle diameter of 5 to 75 nm.

13. The method according to claim 11, wherein the coating step comprises coating a polymeric composition onto a substrate, the polymeric composition comprising a polymeric material having a first Hildebrand's solubility parameter and a poor solvent having a second Hildebrand's solubility parameter, the first Hildebrand's solubility parameter differs from the second Hildebrand's solubility parameter by a value of at least 3.

14. The method according to claim 11, wherein the coating step comprises coating the polymeric composition onto a substrate, the polymeric composition comprising a polymeric material, a good solvent for the polymeric material having a first boiling point and a poor solvent for the polymeric material having a second boiling point, wherein the second boiling point is 25° C. or greater than the first boiling point.

15. The method according to claim 11, wherein the evaporating step comprises evaporating at least a portion of the good solvent and the poor solvent to form a transparent polymeric layer having a thickness from 2 to 10 μm.

16. The method according to claim 11, wherein the substrate has a first refractive index, the transparent polymeric layer has a second refractive index and the first refractive index differs from the second refractive index by a value from 0.05 to 0.2.

17. The method according to claim 11, wherein the coating step comprises coating a polymeric composition onto an optical element.

* * * * *

UNITED STATES PATENT AND TRADEMARK OFFICE
CERTIFICATE OF CORRECTION

PATENT NO. : 7,820,236 B2  Page 1 of 1
APPLICATION NO. : 12/048577
DATED : October 26, 2010
INVENTOR(S) : Richard J Pokorny It is certified that error appears in the above-identified patent and that said Letters Patent is hereby corrected as shown below:

Column 6,
Line 57, Delete "(PMMA)," and insert -- (PMMA)), --, therefor.

Column 8,
Line 4, Delete "miscroscopy" and insert -- microscopy --, therefor.

Column 10,
Line 14, Delete "colume" and insert -- volume --, therefor.

Line 34, Delete "solublize" and insert -- solubilize --, therefor.

Column 12,
Line 51, Delete "Elipsometry" and insert -- Ellipsometry --, therefor.

Column 13,
Line 56, Delete "(FIG." and insert -- (FIGS. --, therefor.

Line 60, Delete "(FIG. 5A, 5B)" and insert -- (FIGS. 5A, 5B) --, therefor.

Signed and Sealed this
Twentieth Day of December, 2011

David J. Kappos
*Director of the United States Patent and Trademark Office*